United States Patent
Castelain et al.

(10) Patent No.: US 8,233,467 B2
(45) Date of Patent: *Jul. 31, 2012

(54) METHOD OF RATIO DATA EMISSION, EMITTER AND RECEIVER USING THE METHOD

(75) Inventors: Damien Castelain, Rennes Cedex (FR); Loic Brunel, Rennes Cedex (FR); David Mottier, Rennes Cedex (FR); Cristina Ciochina, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 396 days.

This patent is subject to a terminal disclaimer.

(21) Appl. No.: 12/526,551

(22) PCT Filed: Jan. 24, 2008

(86) PCT No.: PCT/EP2008/000554
§ 371 (c)(1),
(2), (4) Date: Sep. 17, 2009

(87) PCT Pub. No.: WO2008/098667
PCT Pub. Date: Aug. 21, 2008

(65) Prior Publication Data
US 2010/0040164 A1    Feb. 18, 2010

(30) Foreign Application Priority Data
Feb. 15, 2007    (EP) .................................. 07003191

(51) Int. Cl.
*H04J 1/00*    (2006.01)

(52) U.S. Cl. .................. 370/343; 370/345; 375/267
(58) Field of Classification Search .................. None
See application file for complete search history.

(56) References Cited

U.S. PATENT DOCUMENTS

| | | | |
|---|---|---|---|
| 8,040,867 B2 * | 10/2011 | Castelain et al. | 370/343 |
| 2005/0058217 A1 * | 3/2005 | Sandhu et al. | 375/267 |
| 2006/0078066 A1 | 4/2006 | Yun et al. | |

FOREIGN PATENT DOCUMENTS

| | | |
|---|---|---|
| EP | 1 496 658 | 1/2005 |
| EP | 1 548 970 | 6/2005 |
| WO | 2004 038987 | 5/2004 |

OTHER PUBLICATIONS

U.S. Appl. No. 12/526,849, filed Sep. 16, 2009, Castelain, et al.
U.S. Appl. No. 12/526,985, filed Aug. 13, 2009, Castelain, et al.

* cited by examiner

*Primary Examiner* — Kevin C Harper
(74) *Attorney, Agent, or Firm* — Oblon, Spivak, McClelland, Maier & Neustadt, L.L.P.

(57) ABSTRACT

Coding and decoding schemes useful in the context of MIMO (Multiple Input Multiple Output) or MISO (Multiple Input Single Output) communications especially used in conjunction of OFDM-like transmission schemes. A space frequency block code (SFBC) is based on the simultaneous use of two variants of Alamouti codes in the frequency domain, each kind of Alamouti code being applied to well-chosen pair of frequencies. The proposed SFBC keeps the constant envelope property for each antenna while leading to performance equal or very close to the pure Alamouti STBC performance.

10 Claims, 7 Drawing Sheets

|     | T1 | T2  |
| --- | -- | --- |
| Tx1 | a  | -b* |
| Tx2 | b  | a*  |

Fig. 3a

|     | F1 | F2  |
| --- | -- | --- |
| Tx1 | a  | -b* |
| Tx2 | b  | a*  |

Fig. 3b

|     | F1  | F2 |
| --- | --- | -- |
| Tx1 | a   | b  |
| Tx2 | -b* | a* |

Fig. 3c

|     | F1 | F2  |
| --- | -- | --- |
| Tx1 | a  | b   |
| Tx2 | b* | -a* |

Fig. 3d

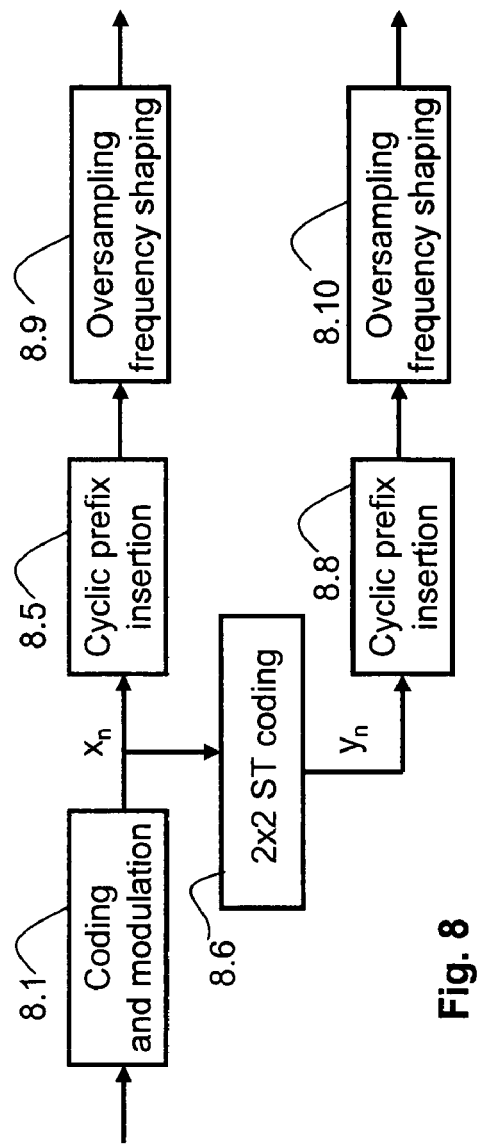
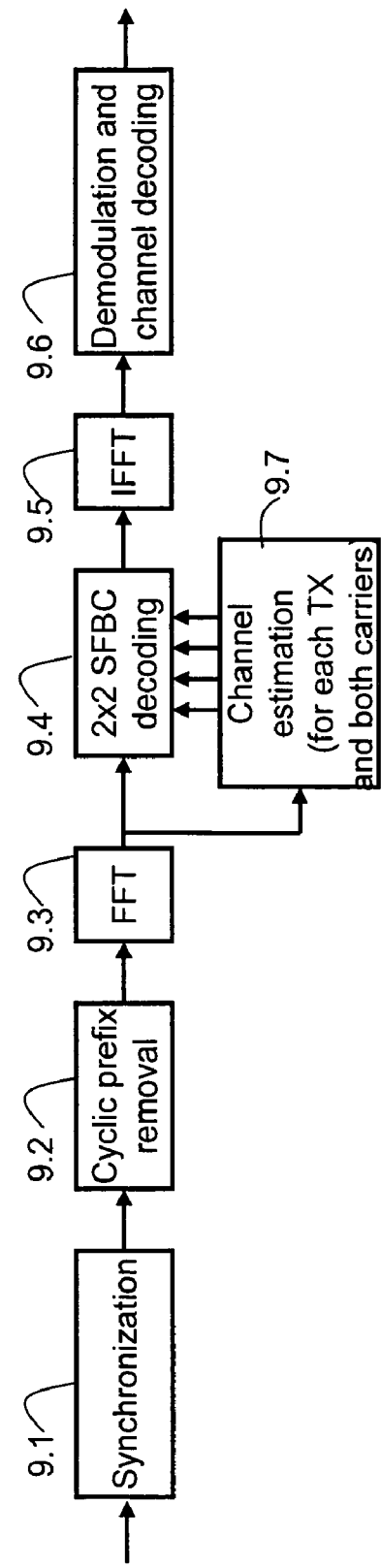
Fig. 8
Fig. 9

METHOD OF RATIO DATA EMISSION, EMITTER AND RECEIVER USING THE METHOD

The invention concerns the domain of wireless communication, and more specifically the coding and decoding schemes useful in the context of MIMO (Multiple Input Multiple Output) or MISO (Multiple Input Single Output) communications especially used in conjunction of OFDM-like transmission schemes.

Orthogonal Frequency-Division Multiplexing (OFDM), like Coded OFDM (COFDM), is based upon the principle of frequency-division multiplexing (FDM), but is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated. This orthogonality occurs when sub-carriers are equally spaced by the symbol rate of a sub-carrier.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM has been developed. In this system each symbol to be transmitted is spread over a set of transmitted frequencies by a DFT (Discrete Fourier Transform), the resulting signal is sent over a conventional OFDM transmission system.

FIG. 1 illustrates the coding implementation in the frequency domain for the transmitter. Actual implementation could be done either in the frequency domain or in the time domain while the implementation in the frequency domain should be preferred for simplicity, especially if a MIMO scheme is used, and to improve frequency separability between emitters emitting in different frequency bands. Data to be transmitted are coded and mapped on symbols by the coding and modulation module 1.1 giving a set of symbols $x_n$. Then the signal is spread in the frequency domain by the FFT (Fast Fourier Transform) module 1.2. Then occurs a step of frequency mapping 1.3 which can comprise zero insertion, equivalent to oversampling in the time domain, frequency shaping, frequency transposition, and possibly filtering. When comprising zero insertion, the output of the frequency mapping module 1.3 results in a vector of size N' greater than N, if not N'=N which is assumed in the following for simplicity and without loss of generality. The signal is transformed back in the time domain by the IFFT (Inverse Fast Fourier Transform) 1.4 for transmission, giving back a set of symbols $x'_n$ very close, if not equal, to the $x_n$ symbols. An optional cyclic prefix insertion 1.5 can be applied before transmission.

FIG. 2 illustrates the decoding implementation in the frequency domain for the receiver. Received data are first synchronized in a step 2.1. If the coder has inserted cyclic prefix, they are removed in a step 2.2. Then, a fast Fourier transform 2.3 is applied to transform the signal in the frequency domain. Then, an equalization step 2.4 occurs using data relative to the channel conditions obtained by a step of channel estimation 2.7. Data are then despread by an inverse fast Fourier transform 2.5 before the demodulation and channel decoding step 2.6.

This system has good properties. In particular, the transmitted signals keep a constant envelope. It is simple to implement with a MMSE (Minimum Mean Square Error) linear equalizer in the frequency domain especially when cyclic prefix is inserted in the signal.

It is known that the use of several antennas, at the emitter, leading to MISO system, or both at the emitter and the receiver, leading to MIMO systems allows the improvement of the robustness of the transmission. This improved robustness can be used to increase the range or the bandwidth by adjusting the classical range versus bandwidth tradeoff Several diversity schemes could be used to take advantage of multiple antennas at the emitter.

Alamouti has developed a code which is a Space Time Block Code (STBC), because information to be transmitted are spread in space, by the different antennas, and in time, using different time slots. The reference paper regarding Alamouti codes is "A simple transmit diversity technique for wireless communications", *IEEE J. Select. Areas Commun.*, vol. 16, pp. 1451-1458, October 1998. In a first implementation of Alamouti code it is contemplated two transmit antennas (Tx1 and Tx2), two symbols a and b sent in two time slots (T1 and T2), at time T1 antenna Tx1 transmits symbol a when antenna Tx2 transmits symbol b. At time T2 antenna Tx1 transmits symbol $-b^*$ when antenna Tx2 transmits symbol $a^*$, where "*" denotes the complex conjugate. This is illustrated in FIG. 3a. This Alamouti code, let us call it classical Alamouti in time, has the advantage to offer a simple coding and decoding, the diversity is increased leading to better performance. It is to be noted that the throughput is not increased. The optimal (MAP for Maximum A Posteriori) decoding is very simple, it does not imply matrix inversion, log enumeration or sphere decoding as long as the channel does not vary between T1 and T2, and as long as the channel can be characterized by a simple multiplication. It is naturally well combined with OFDM or OFDM-like modulation schemes.

A second implementation of Alamouti code called OSFBC for Orthogonal Space Frequency Block Code is illustrated FIG. 3b. It is based on transmission of the data over two different frequencies (F1 and F2), and not over two different time slots.

With 2 transmit antennas (Tx1 and Tx2), two symbols a and b sent on two frequencies (F1 and F2), on frequency F1 antenna Tx1 transmit symbol a when antenna Tx2 transmits symbol b. On frequency F2 antenna Tx1 transmits symbol $-b^*$ when antenna Tx2 transmits symbol $a^*$. Let us call this Alamouti variant the usual code in frequency. Classically, the two frequencies are adjacent, to limit the variations of the channel. By definition, this scheme is applied to OFDM or OFDM-like modulation schemes. By OFDM-like modulations, we include some frequency-domain implementation of a single carrier scheme, in which preferably, but not strictly necessarily, a cyclic prefix has been added, like for example the described DFT-spread OFDM. Compared to OSTBC, the advantage is the use of only one modulation slot, which can be advantageous for the multiplexing point of view, and may lead to better performance in case of very fast variations of the channel like high Doppler. The disadvantage is that the channel may vary between two frequencies, which may lead to degraded performances, or increase the complexity of the receiver. Alamouti codes, due to their simple implementation and good performance are very attractive scheme to be used in MIMO transmission. Unfortunately, when applied to OFDM or OFDM-like modulation schemes, these codes do not have the valuable feature to produce signals with the constant envelope property for each antenna, the envelope being the modulus of the complex envelope.

The issue of the present invention is to design a space-frequency code, easy to code and to decode, that keeps the constant envelope property at each transmit antenna with good performance. Preferably, and in order to simplify the decoding, an implementation of the present invention is made in the frequency domain at the receiver side. This implementation in the frequency domain at the receiver could be used with a transmitter implemented either in the frequency domain or the time domain at this transmitter.

To overcome these problems, the invention proposes a space frequency block code based on the simultaneous use of two variants of Alamouti codes in the frequency domain, each kind of Alamouti code being applied to well-chosen pair of frequencies. The proposed SFBC keeps the constant envelope property for each antenna while leading to performance equal or very close to the pure Alamouti STBC performance.

The invention concerns a method of radio data emission, by an emitter comprising at least two transmit antennas, each antenna transmitting on at least an even number 'N', strictly greater than 4, of different frequencies, comprising a step of emitting on a first antenna during a given time slot on each frequency 'k', with k=0 to N−1, a signal representing a complex symbol '$X_k$' in the frequency domain, a step of emitting on a second antenna during the same time slot, on each frequency 'k', with k=0 to N−1, a signal representing a symbol '$Y_k$' and where, for a given integer value M chosen as an even value between 0 and N−1 inclusive, the symbol $Y_k$ is derived from the symbols $X_k$, for each frequency k, by the formula: $Y_k = \epsilon(-1)^{k+1} X^*_{M-1-k}$, where $\epsilon$ is 1 or −1 and X* means the complex conjugate of X and where M−1−k is taken modulo N, resulting in a pairing of frequencies according to a pairing scheme and applying to each pair of frequencies a variant of an Alamouti code on symbols to be emitted.

In a particular embodiment of the invention, N being divisible by 4, the chosen value of M equal to N/2.

In a particular embodiment of the invention, the chosen value of M equal to 0.

In a particular embodiment of the invention, the method further comprises the step of obtaining the N symbols $X_k$ in the frequency domain relative to data to be transmitted, computing the N symbols $Y_k$ from the symbols $X_k$ according to said formula, generating the N said signals to be emitted on the first antenna from the $X_k$ symbols and generating the N said signals to be emitted on the second antenna from the $Y_k$ symbols.

In a particular embodiment of the invention, the method further comprises the step of obtaining N symbols $x_n$ in the time domain relative to data to be transmitted, computing the N symbols $y_n$ from the symbols $X_k$ according to formula $y_n = \epsilon W^{(M-1)n} x^*_{n-N/2}$ where $W = e^{j2\pi/N}$, where x* stands for the complex conjugate of x, and where n−N/2 is taken modulo N, generating the N said signals to be emitted on the first antenna from the $x_n$ symbols and generating the N said signals to be emitted on the second antenna from the $y_n$ symbols.

The invention also concerns a method of radio data reception, from a transmitter comprising at least two transmit antennas, of signals on at least an even number of frequencies, said signals being emitted as described above, comprising a step of pairing received signals on said frequencies according to the emitting pairing scheme and a step of applying a space frequency code decoding module on each pair of received signals according to the variant of Alamouti encoding code used by the emitter to encode signals emitted on said pair of frequencies.

The invention also concerns an emitting device comprising at least two transmit antennas, means to transmit on each antenna at least an even number 'N' of different frequencies, means to emit on a first antenna during a given time slot on each frequency 'k', with k=0 to N−1, a signal representing a complex symbol '$X_k$' in the frequency domain, means to emit on a second antenna during the same time slot, on each frequency 'k', with k=0 to N−1, a signal representing a symbol '$Y_k$' and wherein, for a given integer value M chosen between 0 and N−1 inclusive, the symbol $Y_k$ is derived from the symbols $X_k$, for each frequency k, by the formula:

$$Y_k = \epsilon(-1)^{k+1} X^*_{M-1-k},$$

where X* means the complex conjugate of X and where $\epsilon$ is 1 or −1.

The invention also concerns a receiving device comprising means to receive signals on at least an even number of frequencies from a transmitter comprising at least two transmit antennas, said signals being emitted according to the method described above, means to pair received signals on said frequencies according to the emitting pairing scheme, means to apply a space frequency code decoding module on each pair of received signals according to the variant of Alamouti encoding code used by the emitter to encode signals emitted on said pair of frequencies.

The characteristics of the invention will emerge more clearly from a reading of the following description of an example embodiment, the said description being produced with reference to the accompanying drawings, among which:

FIG. 3 presents Alamouti codes, in time domain FIG. 3a and in frequency domain FIG. 3b, FIG. 3c and FIG. 3d.

Figure 1:
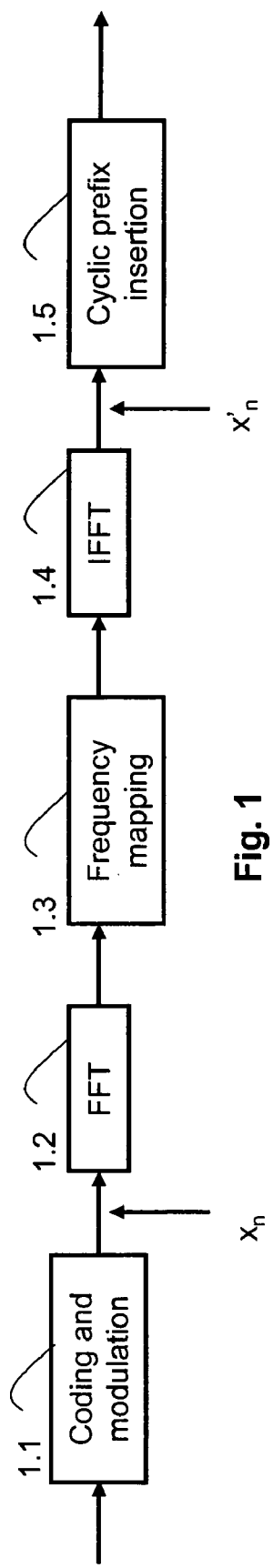
FIG. 1 illustrates the coding implementation in the frequency domain for the transmitter with one emitting antenna.
Figure 2:
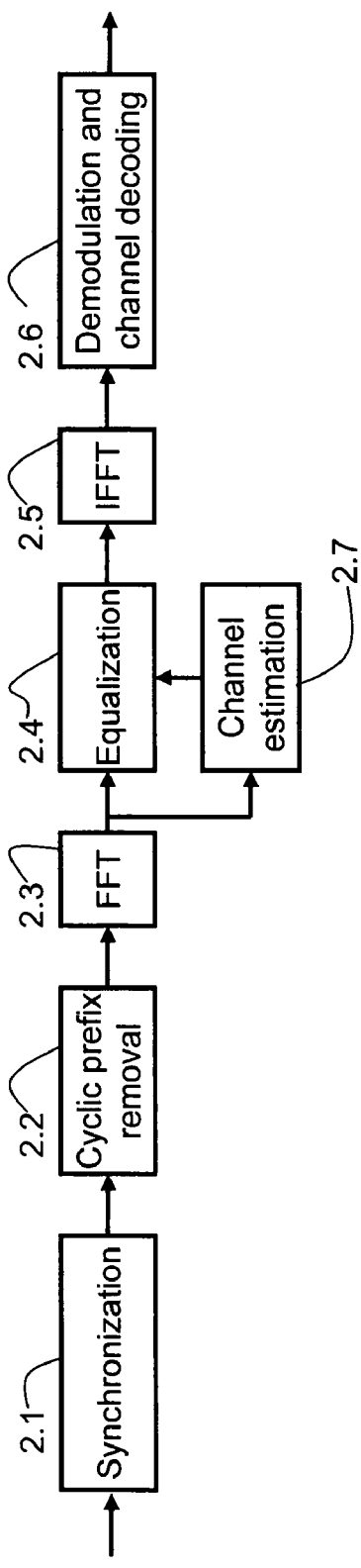
FIG. 2 illustrates the decoding implementation in the frequency domain for the receiver with one receive antenna.
Figure 4:
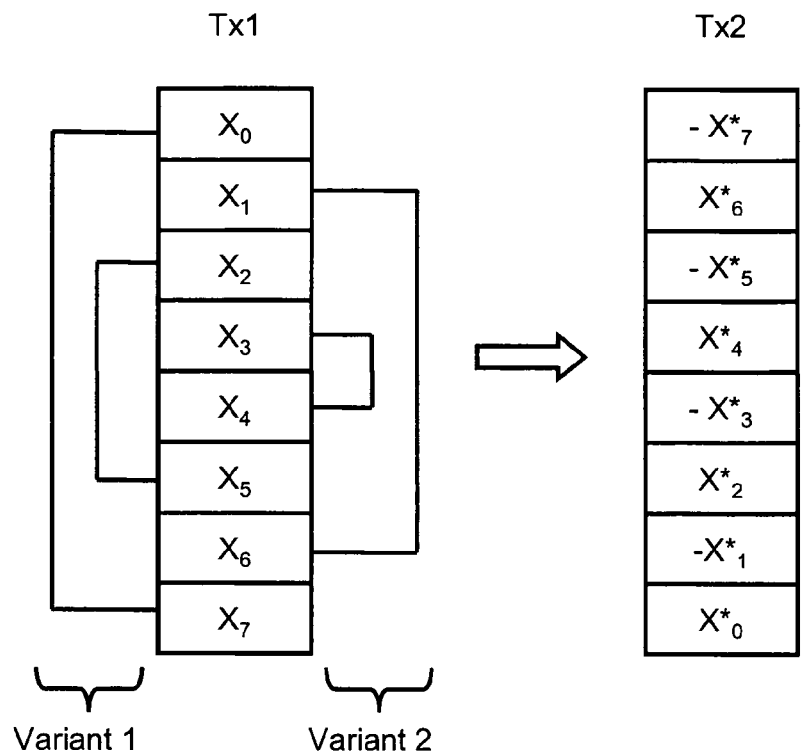

FIG. 4 illustrates the first embodiment for two antennas.

Figure 5:
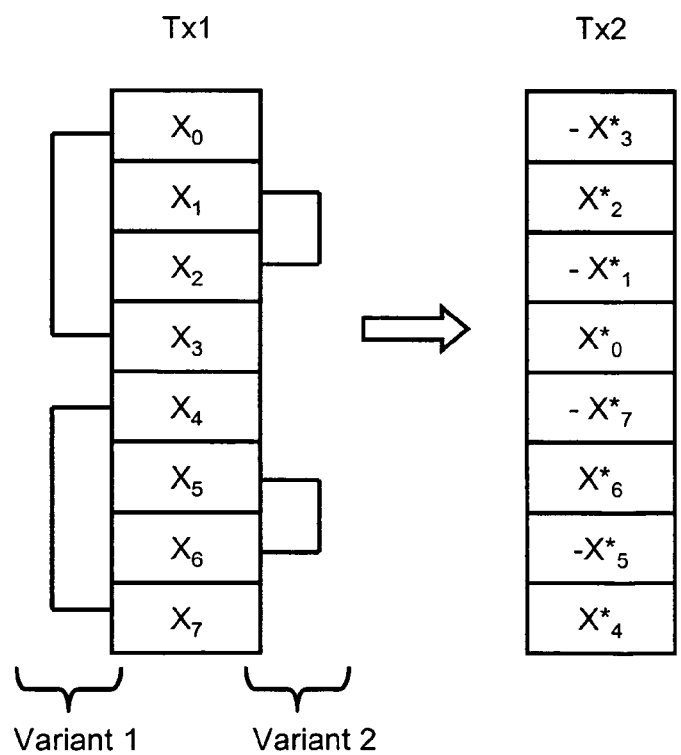

FIG. 5 illustrates the second embodiment for two antennas.

Figure 6:
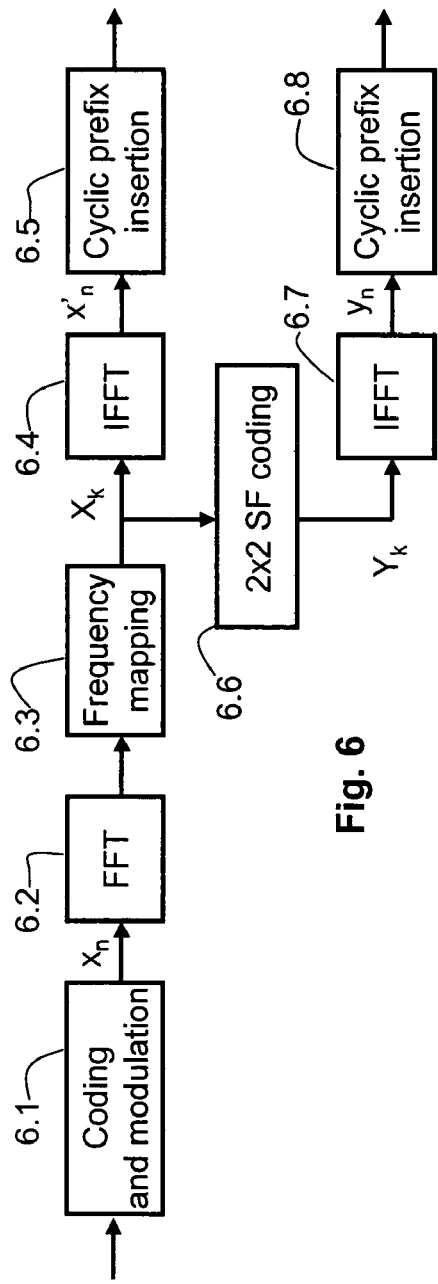

FIG. 6 illustrates the architecture of the encoder for a particular embodiment of the invention in frequency domain.

Figure 7:
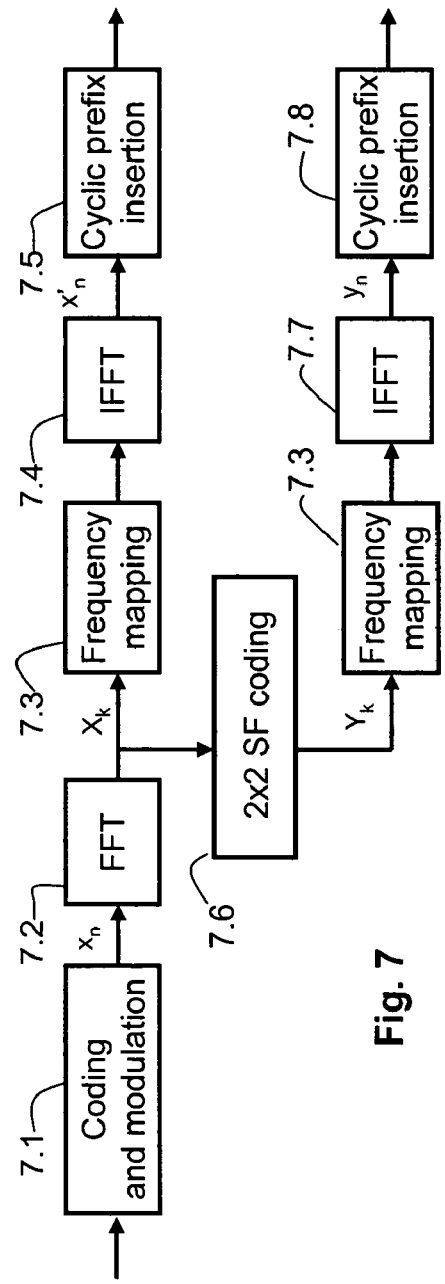

FIG. 7 illustrates the architecture of the encoder for another particular embodiment of the invention in frequency domain.

FIG. 8 illustrates the architecture of the encoder for another particular embodiment of the invention in the time domain.

FIG. 9 illustrates the architecture of the decoder of a device having one receive antenna in a particular embodiment of the invention.

Figure 10:
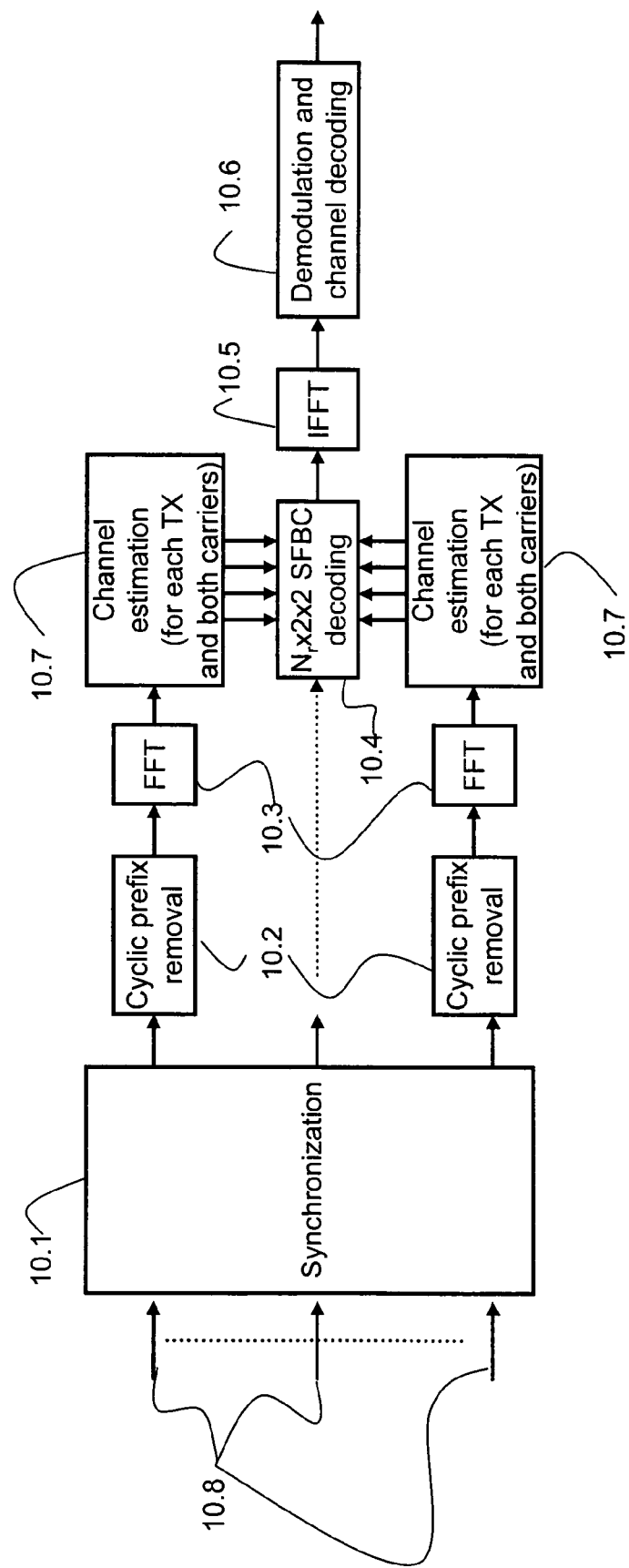

FIG. 10 illustrates the architecture of the decoder of a device having several receive antennas in a particular embodiment of the invention.

Figure 11:
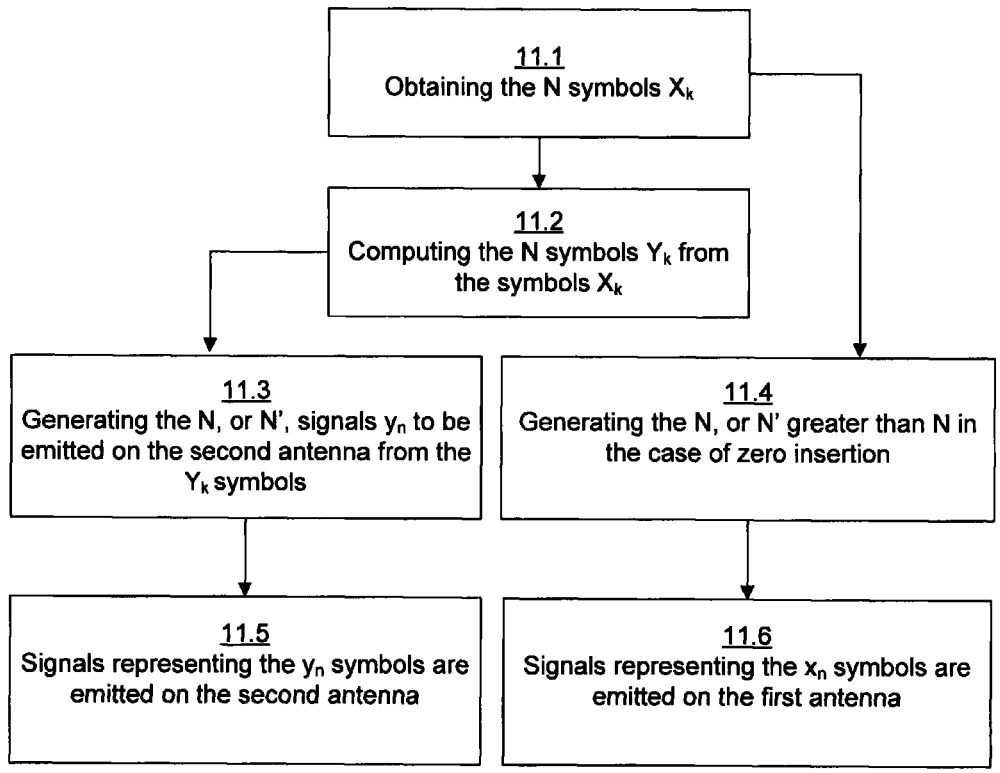

FIG. 11 illustrates the organigram of the emitting method in a particular embodiment of the invention.

Figure 12:
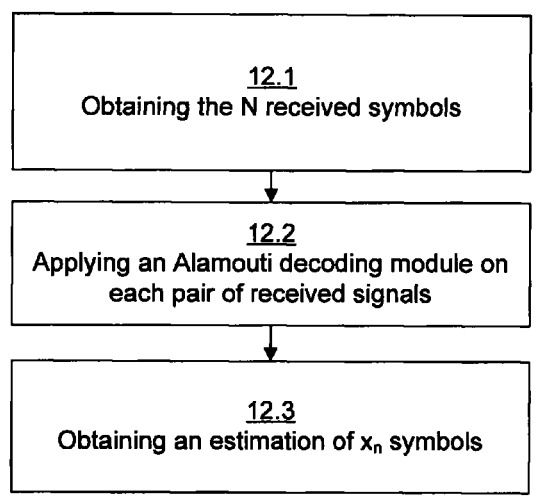

FIG. 12 illustrates the organigram of the receiving method in a particular embodiment of the invention.

As already stated, the problem addressed in this document is to implement a space frequency block code in a transmitting system using at least two transmit antennas. The goal is to propose a space diversity scheme offering near Alamouti performance while keeping the constant envelope property for signals transmitted on each antenna. Of course the simplicity of implementation, especially for decoding, is also an important point of the solution.

A first diversity scheme, known in the art, is called DD for Delay Diversity. It is a very simple multiple antenna transmission scheme. The second antenna transmits a delayed version of the signal sent by the first antenna. One obvious drawback is that it increases the equivalent channel length seen by the transmitter. In systems with a cyclic prefix, CDD for Cyclic Delay Diversity is preferred. CDD, which is also known, is applicable to systems using a cyclic prefix, e.g. OFDM or DFT-spread OFDM. Each block transmitted by the second antenna is a cyclic rotation of the block sent by the first antenna. It allows increasing the diversity, while using a very simple demodulator. In case of DFT-spread OFDM, the two transmitted signals have a constant envelope. However, performances are not as good as those obtained with e.g. an Alamouti code.

While FIG. 3a and FIG. 3b represent the known variants of Alamouti codes, the classic one in the time domain, and the usual one in the frequency domain, FIGS. 3c and 3d present slightly different variants of Alamouti code. It is evident for the man skilled in the art that the variants of Alamouti have the same properties than the usual one.

One can note that the new two variants in frequency domain, let's call them variant 1 illustrated FIG. 3c and variant 2 illustrated FIG. 3d, both guarantee that the signal transmitted by Tx1 has a constant envelope, as it corresponds to the signal that is transmitted when no MIMO scheme is used.

When using transmission according to an OFDM-like transmission scheme, we have to transmit several carriers at different frequencies in the used band of frequencies. It is proposed to associate these frequencies by pair and to apply one of the Alamouti variants to each pair of frequencies. It can be seen that the constant envelope property will depend on the scheme of association of the different frequencies and the chosen variant of Alamouti for each pair. In a first embodiment of the invention, implemented in the frame of an even number N of frequencies, the association of the two variants of Alamouti with the DFT-spread OFDM is as follows:

First, associate the first frequency, index 0, with the last one of index N−1, then the second one with the (N−1)$^{th}$ one of index N−2, etc.

Secondly, alternate the use of the two variants of Alamouti code, variant 1 and variant 2, to each pair of associated frequencies as described in FIG. 4.

FIG. 4 illustrates the scheme of the invention for two antennas, Tx1 and Tx2. The scheme is explained using eight frequencies, without taking into account eventual null subcarrier that could have been added, it extends naturally to any even number of frequencies. Symbols $X_0$ to $X_7$ represent the different symbols sent on the different frequencies via antenna Tx1 at a given time. Using the same numbering for frequencies, one can see that frequency F0 is associated with frequency F7, and frequency F2 is associated with frequency F5 using variant 1 of Alamouti code. In the same time, frequency F1 is associated with frequency F6, and frequency F3 is associated with frequency F4 using variant 2 of Alamouti code. Of course, the usage of the two variants can be used interchangeably. This arrangement leads to the given transmission on the second antenna Tx2 which transmit in order of frequencies the symbols $-X^*_7, X^*_6, -X^*_5, X^*_4, -X^*_3, X^*_2, -X^*_1, X^*_0$. Due to the regular alternate in sign and that the symbols are spread on the frequencies keeping a regular order compared to the order on the first antenna, one can prove that the signals sent by the second antenna have a constant envelope.

In the frequency domain, this corresponds to the formula $Y_k=\epsilon(-1)^{k+1}X^*_{N-1-k}$, where $\epsilon$ stands for 1 or −1. Actually, $\epsilon$ corresponds to an inversion in the use of the two variants of Alamouti. It has to be noted that for values of N lower than or equal to 4 the formula may lead to known schemes. If an implementation of the encoder in the time domain is made we do not have the $X_k$ symbols in the frequency domain but instead we have a sequence of $x_n$ symbols in the time domain. Therefore, the given relationship between $X_k$ and $Y_k$ symbols in the frequency domain correspond to a dual relationship in the time domain leading to the generation of the same signals. This relationship in the time domain is expressed:

$y_n=\epsilon W^{-n}x^*_{n-N/2}$, with $W=e^{j2\pi/N}$, where $\epsilon$ equal 1 or −1 and where n−N/2 is expressed modulo N. This formula is valid when neglecting optional operation of zero insertion which does not modify the constant envelope property significantly.

This solution is applicable for all even N. The symbols being associated can be largely separated in frequency, and these frequencies are likely to correspond to different channel responses. This may lead to a slight degradation of the performances, and a small increase of the elementary Alamouti decoder complexity. When this technique is contemplated for the uplink of a cellular transmission system, the receiver is generally implemented in the base station, and the corresponding increase in complexity is, in this case, negligible. If N is a multiple of 4 (N=4p), it is possible to decrease the frequency separation by applying the previous scheme on each half of the frequency multiplex, as illustrated in FIG. 5. This leads to a second embodiment of the invention.

With the same convention as in the first embodiment, in the frequency domain, this second embodiment corresponds to the formula $Y_k=\epsilon(-1)^{k+1}X^*_{N/2-1-k}$, leading to a dual formula in the time domain corresponding to $y_n=\epsilon(-1)^n W^{-n}x^*_{n-N/2}$, with $W=e^{j2\pi/N}$. In general in the entire document, the expression of indices like n−N/2, N/2−1−k or M−1−k is expressed modulo N.

However, it is possible to generalize both embodiments by the following general scheme, for any M even between 0 and N−1:

frequency representation: $Y_k=\epsilon(-1)^{k+1}X^*_{M-1-k}$, where an Alamouti variant scheme is performed between carriers k and M−1−k.

time representation: $y_n=\epsilon W^{(M-1)n}x^*_{n-N/2}$

It should be well understood, that both time and frequency implementations leads to the generation of the very same signals to be emitted. The emitted signals could be seen as representative of the $X_k$ and $Y_k$ symbols, linked by formula $Y_k=\epsilon(-1)^{k+1}X^*_{M-1-k}$, if interpreted in the frequency domain even if generated using a time domain implementation based on $x_n$ and $y_n$ symbols, linked by formula $y_n=\epsilon W^{(M-1)n}x^*_{n-N/2}$, in the time domain. It should also be noted that these formulas do not take into account the interpolation and the frequency shift which could be implemented either in frequency or in time.

The first embodiment corresponds to M=0, and the second one to M=N/2 which implies N/2 to be even, therefore N=4p. All these embodiments solve the problem of producing near Alamouti performance while keeping the constant envelope property.

We will now describe the implementation of the invention according to a particular embodiment of the invention.

A first variant of the frequency implementation of the encoder is provided in FIG. 6, and a second one in FIG. 7. Data to be transmitted are coded and mapped on symbols by the coding and modulation module 6.1 and 7.1 giving a set of symbols $x_n$. Then the signal is spread in the frequency domain by the FFT (Fast Fourier Transform) module 6.2 and 7.2. Then occurs a module of frequency mapping 6.3 and 7.3 which can comprise zeros insertion, frequency shaping and so on. The signal is transformed back in the time domain by the IFFT (Inverse Fast Fourier Transform) 6.4 and 7.4 for transmission, giving back a set of symbols $x'_n$ very close, if not equal, to the first $x_n$ symbols. An optional cyclic prefix insertion 6.5 and 7.5 can be applied before transmission. A second antenna is feed by data computed by the space frequency block code computation 6.6 and 7.6, leading to a new branch having IFFT, 6.7 and 7.7 and optional cyclic prefix insertion 6.8 and 7.8 as in the first branch. Differences between both implementations are minor, and correspond to the placement of the space frequency coding function, 6.6 and 7.6, relatively to the frequency mapping function 6.3 and 7.3. It must be noted that these implementations are very general, and applicable to any two by two space frequency coding. The core of the invention is the actual two by two space frequency block code used in function 6.6 and 7.6 according to the above given formula.

An implementation in the time domain of the encoder is presented in FIG. 8. Data to be transmitted are coded and mapped on symbols by the coding modulation module 8.1 giving a set of symbols $x_n$. An optional cyclic prefix insertion 8.5 can then be applied to the signal. Then occurs a module of frequency shaping 8.9, which can comprise oversampling, filtering and frequency transposition, before transmission.

The module 8.6 applies a time implementation of the code. This module is based on the equivalent formula in time domain given above. The second branch is subject to the same treatment as the first one with an optional cyclic prefix insertion module 8.8 and an oversampling and frequency-shaping module 8.10.

An implementation of the decoder in the frequency domain is presented in FIG. 9 for one receive antenna, and in FIG. 10 for $N_r$ several receive antennas. In FIG. 9, received data are first synchronized in a module 9.1. If the coder has inserted cyclic prefix, they are removed in a module 9.2. Then a fast Fourier transform 9.3 is then applied to transform the signal in the frequency domain. Then an equalization module 9.4 occurs using data relatives to the channel conditions obtained by a module of channel estimation 9.7. The channel estimation is done for each emitting antenna and each frequency used. This equalization module applies the space frequency block decoding to data according to the code used by the encoder. Data are then dispread by an inverse fast Fourier transform 9.5 before the demodulation and channel decoding module 9.6. While the FIG. 10 illustrates the decoder architecture in the case where several receive antennas are used. Several signals 10.8 are received from the receive antennas. The synchronization module 10.1 synchronizes all these signals. The optional cyclic prefix removal 10.2 is done, if used, in parallel to all the synchronized signals prior to the FFT 10.3 applied also to each signal. $N_r$ modules, possibly one complex module, of channel estimation 10.7 will work on the $N_r$ signals feeding one decoder module 10.4 comprising a $N_r$ by two by two elementary space frequency block decoder serially processing the N/2 pairs of sub-carriers. An inverse FFT module 10.5 before a classical channel decoding 10.6 treats the resulting signal.

To benefit from the characteristics of the invention, the decoding is performed preferably in the frequency dimension. The invention relies partly in the space frequency block code decoding module itself, but also in the possibility to perform this kind of simple decoding, with the space frequency block code decoding module processing one pair of carriers only at a time, the different pairs of carriers being decoded independently one from each other. This last property is not fulfilled by most of the schemes that would have been defined in the time dimension inside one module. On the other hand, a classical Alamouti scheme performed on adjacent sub-carriers will have this property also, but not with the constant envelope characteristic.

Concerning the complexity of the SFBC decoding in the multi-antenna case illustrated by FIG. 10, the MMSE (Minimum Mean Square Error) decoder will consist in a matched filter, this is to say multiplication by a complex matrix of size $2 \times 2N_r$, or a real matrix of size $4 \times 4N_r$, following at most by the resolution of a $2 \times 2$ complex linear system, or the resolution of a $4 \times 4$ real linear system. Further studies and simulations will confirm whether this inversion is needed or not. The corresponding complexity is affordable anyway.

We will now detail the decoding of MIMO codes, for possibly non-stationary channels. At first, a general way of decoding LD (Linear Dispersion) codes in the real domain will be presented. Then, this method will be applied to Alamouti code and its variants, for possibly non-stationary channels.

Let us define the following parameters:
K is the number of information symbols per code word,
N is the number of sub-carriers,
L is the time or frequency dimension, this is to say the number of time slots or number of sub-carriers involved in the space time or space frequency coding, in the case of Alamouti L is 2,
Nr is the number of receive antennas,
Nt is the number of transmit antennas.

And let us define the following vectors and matrices:
x is a vector of complex of size K×1 representing information data;
xr is a vector of real of size 2K×1 representing information data in real representation;
H is a matrix of complex of size L.Nr×L.Nt representing channel response in frequency domain;
Hi is a matrix of complex of size Nr×Nt representing channel response for time slot i or sub-carrier i;
Hr is a matrix of real of size 2L.Nr×2L.Nt representing channel in real representation;
s is a matrix of complex of size Nt×L representing encoded data, in matrix representation;
sv is a vector of complex of size Nt.L×1 representing encoded data, in vector representation: sv=vect (s);
A, B are matrices of complex of size L.Nt×K representing encoding matrices;
Cr is a matrix of real of size 2L.Nt×2K representing equivalent real encoding matrix;
y is a vector of complex of size L.Nr×1 representing received data, in vector representation;
yr is a vector of real of size 2L.Nr×1 representing received data, in vector and real representation;
v is a vector of complex of size L.Nr×1 representing noise vector;
vr is a vector of real of size 2L.Nr×1 representing noise vector, in real representation.

In classical description of MIMO schemes, it is assumed that the influence of the channel can be modelled by a linear transformation. Practically, for wide band systems, this assumes that this description is performed in the frequency domain. In OFDM or DFT-spread-OFDM systems, or any particular multi-carrier system, this implies that the MIMO scheme is applied to one, for STBC, or a small number L, for SFBC, of sub-carriers. At that point, one must consider STBC and SFBC schemes separately.

In a STBC scheme, for each sub-carrier k, among N transmitted sub-carriers, a space-time, ST, encoding is applied, spread over generally successive L time slots, a time slot corresponding here to an OFDM symbol. If we assume for example that there are 2 transmit antennas Tx0 and Tx1, then $N_t=2$, and L=2 time slots, a symbol $a_{i,j}^k$ will be transmitted on antenna i during the time slot j, for this sub-carrier k. In matrix notation, this corresponds to sending the matrix:

$$s^k = \begin{pmatrix} a_{00}^k & a_{01}^k \\ a_{10}^k & a_{11}^k \end{pmatrix}$$

As far as ST encoding and decoding are concerned, the corresponding N flows are processed in parallel: therefore, for simplicity and without loss of generality, the superscript k will be omitted in the following.

In a SFBC scheme, only one time slot, i.e. one OFDM symbol, is concerned by a particular space-frequency, SF, encoding or decoding. However, N/L SF encoding/decoding will be processed in parallel and independently, each SF encoding being spread on L different sub-carriers. Let us call k the index of the SF encoding, k between 0 and N/L−1. This encoding is applied on the L sub-carriers $k_0, k_1, \ldots, k_{L-1}$. Then, after SF encoding, a symbol a $a_{i,kj}^k$ is transmitted on sub-carrier $k_j$ by the transmit antenna i. If we assume for example that there are 2 transmit antennas Tx0 and Tx1 ($N_t$=2), and that L=2 sub-carriers are used for each SF encoding, this corresponds to sending the matrix:

$$s^k = \begin{pmatrix} a_{0,k0}^k & a_{0,k1}^k \\ a_{1,k0}^k & a_{1,k1}^k \end{pmatrix}$$

As long as SF encoding and decoding are concerned, the corresponding N/L flows are processed in parallel: therefore, for simplicity and without loss of generality, the superscript k will be omitted in the following, and we will consider that the matrix s is sent:

$$s = \begin{pmatrix} a_{00} & a_{01} \\ a_{10} & a_{11} \end{pmatrix}$$

The encoded data of a space-time or space-frequency (ST/SF) code can be represented in matrix or vector form. The more natural way to describe the encoding is with the matrix form, as used above. Indeed, this matrix form generally leads to an easier representation of the encoding process itself. However, the vector form will be used for it simplifies the representation of the channel and of the decoding. In the following, a vector is obtained from a matrix by superposing the different columns of it.

For example, if s and sv are the matrix and vector representations of the encoded data, then $$sv[i+j*N_t]=s[i][j],$$

that can be illustrated in the SFBC case by:

$$s = \begin{bmatrix} a_{00} & a_{01} \\ a_{10} & a_{11} \end{bmatrix} \Rightarrow sv = \begin{bmatrix} a_{00} \\ a_{10} \\ a_{01} \\ a_{11} \end{bmatrix} \begin{array}{l} \rightarrow \text{antenna 0, frequency 0} \\ \rightarrow \text{antenna 1, frequency 0} \\ \rightarrow \text{antenna 0, frequency 1} \\ \rightarrow \text{antenna 1, frequency 1} \end{array}$$

In a very general sense, the ST/SF encoding can be represented by the following complex representation of LD codes:

$$sv = Ax + Bx^*$$

where x is the information under vector form prior to ST/SF encoding. Examples of A and B matrices are provided below when presenting decoding for Alamouti. If B=0, the ST/SF encoding is said linear, which is not the case for the Alamouti scheme.

Let us present the channel representation. In the frequency domain, we assume that at a given instant and a given frequency, i.e. a given sub-carrier, the channel can be modelled by a simple multiplicative coefficient. In a SISO case, this means that at sub-carrier i, the received sample is equal to:

$$y_i = H_i a_i + \text{noise},$$

where $H_i$ is a complex coefficient in this SISO case, and $a_i$ is the transmitted value.

The formulas for the MIMO case derive directly from this model. For example, for SFBC case, at sub-carrier i and at the receive antenna j, the received sample is equal to:

$$y_i(j) = \sum_{l=0}^{N_t-1} H_i(j,l) a_{l,i} + \text{noise},$$

where $H_i(j,l)$ is a complex coefficient corresponding to the frequency channel response between antennas l and j at frequency i, and $a_{k,i}$ is the data transmitted at sub-carrier i by transmit antenna k.

Therefore, the channel can be represented by a matrix of the form:

$$H = \begin{bmatrix} H_0 & 0 & 0 \\ 0 & \ddots & 0 \\ 0 & 0 & H_{L-1} \end{bmatrix},$$

where matrix $H_i$ is the channel's frequency response at time i (STBC case) or frequency i (sub-carrier $k_i$, SFBC case), and when the entry (j,l) of matrix $H_i$ corresponds to the channel coefficient between transmit antenna l and receive antenna j. When the channel is stationary, all $H_i$ matrices are equal.

It follows that the received complex vector is equal to:

$$y = Hsv + v = H(Ax + Bx^*) + v, \text{ where v is the additive white Gaussian noise.}$$

This formula has an equivalent real representation:

$$yr = HrCrxr + vr$$

which has the great advantage to be in linear form.

Vector xr (resp. yr, vr) is obtained from x (resp. y, v) by superposing the real and imaginary parts of the original complex vector. For example:

$$x = \begin{bmatrix} x_0 \\ x_1 \\ x_2 \end{bmatrix} \Rightarrow xr = \begin{bmatrix} x_0^R \\ x_1^R \\ x_2^R \\ x_0^I \\ x_1^I \\ x_2^I \end{bmatrix},$$

where the superscripts R and I stand for Real and Imaginary parts.

Matrices Cr and Hr are easily obtained by:

$$Hr = \begin{bmatrix} H^R & -H^I \\ H^I & H^R \end{bmatrix},$$

and $$Cr = \begin{bmatrix} A^R + B^R & -A^I + B^I \\ A^I + B^I & A^R - B^R \end{bmatrix}.$$

Very often, and especially for Alamouti code, rather simple representation of the MMSE (Minimum Mean Square Error) decoding can be found in real or complex forms. The complex representation looks in general simpler. However, it does not mean that it corresponds to fewer operations. Moreover, the general form of the encoder is not linear in its complex form, and the simple complex representation, when it exists, implies ad hoc transformations, i.e. that depends on the code. In order to stay general, we will first present only the description of the MMSE decoder in the real domain, keeping in mind that for Alamouti, simple representations in the complex domain also exist. Such description of Alamouti decoding in the complex domain is provided below.

From the above, the MMSE formulation is very simple. The receiver real vector can the reformulated as:

$yr=Fxr+vr$, with $F=HrCr$

It follows directly that the MMSE estimator of xr is equal to $zr=\hat{x}r=(F^T F+\sigma^2 I_{2K})^{-1} F^T yr$ Where $\sigma^2$ is the variance of the complex noise v and $I_{2K}$ the identity matrix of size 2K and where $F^T$ stands for the transpose of F.

It is worthwhile noting that whatever the number of antennas or the number of time slots (or the number of sub-carriers), only a real matrix of size 2K has to be inverted. When a complex representation is available, a complex matrix of size K is inverted.

In this case of Alamouti, we have $N_t=2$, $K=2$, $L=2$, $N_r$ variable.

For the classical time or frequency version of Alamouti we get:

$$s = \begin{bmatrix} x_0 & -x_1^* \\ x_1 & x_0^* \end{bmatrix}, sv = \begin{bmatrix} x_0 \\ x_1 \\ -x_1^* \\ x_0^* \end{bmatrix}, A = \begin{bmatrix} 1 & 0 \\ 0 & 1 \\ 0 & 0 \\ 0 & 0 \end{bmatrix}, B = \begin{bmatrix} 0 & 0 \\ 0 & 0 \\ 0 & -1 \\ 1 & 0 \end{bmatrix}.$$

For the first variant of Alamouti we get:

$$s = \begin{bmatrix} x_0 & x_1 \\ -x_1^* & x_0^* \end{bmatrix}, sv = \begin{bmatrix} x_0 \\ -x_1^* \\ x_1 \\ x_0^* \end{bmatrix}, A = \begin{bmatrix} 1 & 0 \\ 0 & 0 \\ 0 & 1 \\ 0 & 0 \end{bmatrix}, B = \begin{bmatrix} 0 & 0 \\ 0 & -1 \\ 0 & 0 \\ 1 & 0 \end{bmatrix}.$$

And for the second variant of Alamouti, we get:

$$s = \begin{bmatrix} x_0 & x_1 \\ x_1^* & -x_0^* \end{bmatrix}, sv = \begin{bmatrix} x_0 \\ x_1^* \\ x_1 \\ -x_0^* \end{bmatrix}, A = \begin{bmatrix} 1 & 0 \\ 0 & 0 \\ 0 & 1 \\ 0 & 0 \end{bmatrix}, B = \begin{bmatrix} 0 & 0 \\ 0 & 1 \\ 0 & 0 \\ -1 & 0 \end{bmatrix}.$$

At this point, we have described a general formula of MMSE decoder for all LD codes in the real domain. They can be applied to Alamouti codes and its variants with the above A and B Matrices. We will now present equivalent and somehow simpler representation of the MMSE decoder for the Alamouti code and its variants in the complex domain. For each version of the Alamouti code, the MMSE detector can be described in complex form.

For the classic Alamouti, using the notation above, the transmitted vector is equal to:

$$sv = \begin{bmatrix} x_0 \\ x_1 \\ -x_1^* \\ x_0^* \end{bmatrix}$$

And the received vector y is equal to:

$$y = \begin{bmatrix} y_0 \\ y_1 \end{bmatrix} = \begin{bmatrix} H_0 \begin{pmatrix} x_0 \\ x_1 \end{pmatrix} \\ H_1 \begin{pmatrix} 0 & -1 \\ 1 & 0 \end{pmatrix} \begin{pmatrix} x_0^* \\ x_1^* \end{pmatrix} \end{bmatrix} + v$$

where $y_0$ and $y_1$ are vectors of size $N_r$.

We define y' by taking the conjugate of the data corresponding to the second time slot, or second sub-carrier for the frequency code:

$$y' = \begin{bmatrix} y_0 \\ y_1^* \end{bmatrix}$$

We directly obtain:

$$y' = \begin{bmatrix} H_0 \\ H_1^* \begin{pmatrix} 0 & -1 \\ 1 & 0 \end{pmatrix} \end{bmatrix} \begin{bmatrix} x_0 \\ x_1 \end{bmatrix} + v' = D \begin{bmatrix} x_0 \\ x_1 \end{bmatrix} + v'$$

As it is a linear expression, the MMSE estimation of x is provided simply by:

$\hat{x}=(D^H D+\sigma^2 I_K)^{-1} D^H y'$, where $D^H$ stands for the Hermitian of D.

For the first variant of Alamouti in frequency, the transmitted vector is equal to:

$$sv = \begin{bmatrix} x_0 \\ -x_1^* \\ x_1 \\ x_0^* \end{bmatrix}$$

Let us define x' by $$x' = \begin{bmatrix} x_0' \\ x_1' \end{bmatrix} = \begin{bmatrix} x_0 \\ -x_1^* \end{bmatrix}$$

Then the transmitted vector is now equal to:

$$sv = \begin{bmatrix} x_0' \\ x_1' \\ -x_1'^* \\ x_0'^* \end{bmatrix}$$

And the received vector after conjugating the second part as in previous section is now expressed as:

$$y' = \begin{bmatrix} y_0 \\ y_1^* \end{bmatrix} = \begin{bmatrix} H_0 \\ H_1^* \begin{pmatrix} 0 & -1 \\ 1 & 0 \end{pmatrix} \end{bmatrix} \begin{bmatrix} x_0' \\ x_1' \end{bmatrix} + v' = D \begin{bmatrix} x_0' \\ x_1' \end{bmatrix} + v' = Dx' + v'$$

As it is again a complex linear expression, the MMSE estimation of x' is provided simply by:

$$\hat{x}' = (D^H D + \sigma^2 I_K)^{-1} D^H y'$$

and the MMSE estimation of x follows as:

$$\hat{x} = \begin{bmatrix} \hat{x}_0' \\ -\hat{x}_0'^* \end{bmatrix}$$

For the second variant of Alamouti in frequency, the transmitted vector is equal to:

$$sv = \begin{bmatrix} x_0 \\ x_1^* \\ x_1 \\ -x_0^* \end{bmatrix}$$

Let us define x" by $$x'' = \begin{bmatrix} x_0'' \\ x_1'' \end{bmatrix} = \begin{bmatrix} x_0 \\ x_1^* \end{bmatrix}$$

Then the transmitted vector is now equal to:

$$sv = \begin{bmatrix} x_0'' \\ x_1'' \\ x_1''^* \\ -x_0''^* \end{bmatrix}$$

And the received vector after conjugating the second part as in previous section is now expressed as:

$$y' = \begin{bmatrix} y_0 \\ y_1^* \end{bmatrix} = \begin{bmatrix} H_0 \\ H_1^* \begin{pmatrix} 0 & 1 \\ -1 & 0 \end{pmatrix} \end{bmatrix} \begin{bmatrix} x_0'' \\ x_1'' \end{bmatrix} + v' = E \begin{bmatrix} x_0'' \\ x_1'' \end{bmatrix} + v' = Ex'' + v'$$

As it is again a complex linear expression, the MMSE estimation of x" is provided simply by:

$$\hat{x}'' = (E^H E + \sigma^2 I_K)^{-1} E^H y'$$

and the MMSE estimation of x follows as:

$$\hat{x} = \begin{bmatrix} \hat{x}_0'' \\ \hat{x}_1''^* \end{bmatrix}$$

FIG. 11 illustrates the organigram of the emitting method in the frequency domain according to a particular embodiment of the invention. Step 11.1 is the step of obtaining the N symbols $X_k$ in the frequency domain relatives to data to be transmitted. Step 11.2 is the step of computing the N symbols $Y_k$ from the symbols $X_k$ according to formula $Y_k = \epsilon (-1)^{k+1} X^*_{M-1-k}$. Step 11.4 is the step of generating the N, or N' greater than N in the case of zero insertion as already mentioned, said signals to be emitted on the first antenna from the $X_k$ symbols. Step 11.3 is the step of generating the N, or N', said signals $y_n$ to be emitted on the second antenna from the $Y_k$ symbols. In step 11.6 signals representing the $x_n$ symbols are emitted on the first antenna while signals representing the $y_n$ symbols are emitted on the second antenna in step 11.5.

FIG. 12 illustrates the organigram of the receiving method, in the case of one receive antenna, in a particular embodiment of the invention. Step 12.1 is the step of obtaining the N received symbols in the frequency domain relatives to data that have been transmitted. Step 12.2 is the step of applying an Alamouti decoding module on each pair of received signals according to the variant of Alamouti encoding code used by the emitter to encode signals emitted on said pair of frequencies. In a step 12.3 an estimation of $x_n$ symbols in time domain is obtained from the above estimated symbols in the frequency domain.

The MIMO scheme described with two antennas can be extended to any even number of antennas. The extension is done by grouping the antenna by pair and to apply one of the coding schemes, as defined in the invention, to each pair of antennas.

The invention can be applied to any transmission system that will use several transmitters. It is very likely to concern wireless systems; however, it could be used e.g. to line transmissions in which crossover interference would occur. Moreover, it was described in DFT-spread OFDM context. However, any modulation scheme could use the proposed invention, even if a real benefit will only occur for modulations with a constant envelope. Concerning the cyclic prefix, it simplifies the receiver implementation in the frequency domain. However, other frequency domain implementation of the receiver should be possible without it, even if it would be more complex. Examples of such implementation are overlap methods (e.g. overlap-add or overlap-save). In overlap-save method, N samples will be treated in the frequency domain and transform in the time domain, and only some of them will be kept in the time domain. The corresponding treatment windows are overlapping to insure that all the received samples are treated.

The invention claimed is:

1. A method of radio data emission, by an emitter including at least two transmit antennas, each antenna transmitting on at least an even number 'N', strictly greater than 4, of different frequencies, the method comprising:
emitting, on a first antenna and during a given time slot on each frequency 'k', with k=0 to N−1, a signal representing a complex symbol '$X_k$' in the frequency domain; and
emitting, on a second antenna and during the same time slot, on each frequency 'k', with k=0 to N−1, a signal representing a symbol '$Y_k$',
wherein for a given integer value M chosen as an even value between 0 and N−1 inclusive, the symbol $Y_k$ is derived from the symbols $X_k$, for each frequency k, by a formula: $Y_k = \epsilon(-1)^{k+1} X^*_{M-1-k}$, wherein $\epsilon$ is 1 or −1 and $X^*$ indicates the complex conjugate of X and M−1−k is taken modulo N;
resulting in a pairing of frequencies according to a pairing scheme and applying to each pair of frequencies a variant of an Alamouti code on symbols to be emitted.

2. The method according to claim 1, wherein N being divisible by 4, the chosen value of M is equal to N/2.

3. The method according to claim 1, wherein the chosen value of M is equal to 0.

4. The method according to claim 1, further comprising:
obtaining the N symbols $X_k$ in the frequency domain relative to data to be transmitted;
computing the N symbols $Y_k$ from the symbols $X_k$ according to the formula;
generating the N signals to be emitted on the first antenna from the $X_k$ symbols; and
generating the N signals to be emitted on the second antenna from the $Y_k$ symbols.

5. The method according to claim 1, further comprising:
obtaining N symbols $x_n$ in the time domain relative to data to be transmitted;
computing the N symbols $y_n$ from the symbols $x_k$ according to formula $y = \epsilon W^{(M-1)n} x^*_{n-N/2}$, wherein $W = e^{j2\pi/N}$, $x^*$ stands for the complex conjugate of x, and n−N/2 is taken modulo N;
generating the N signals to be emitted on the first antenna from the $x_n$ symbols; and
generating the N signals to be emitted on the second antenna from the $y_n$ symbols.

6. A method of radio data reception, from a transmitter including at least two transmit antennas, of signals on at least an even number of frequencies, the signals being emitted according to claim 1, the method comprising:
pairing received signals on said frequencies according to the emitting pairing scheme; and
applying a space frequency code decoding module on each pair of received signals according to the variant of Alamouti encoding code used by the emitter to encode signals emitted on said pair of frequencies.

7. An emitting device comprising:
at least two transmit antennas;
means for transmitting, on each antenna, at least an even number 'N' of different frequencies;
means for emitting, on a first antenna and during a given time slot on each frequency 'k', with k=0 to N−1, a signal representing a complex symbol '$X_k$' in the frequency domain; and
means for emitting, on a second antenna and during the same time slot, on each frequency 'k', with k=0 to N−1, a signal representing a symbol '$Y_k$',
wherein for a given integer value M chosen between 0 and N−1 inclusive, the symbol $Y_k$ is derived from the symbols $X_k$, for each frequency k, by a formula: $Y_k = \epsilon(-1)^{k+1} X^*_{M-1-k}$, wherein $X^*$ indicates the complex conjugate of X and $\epsilon$ is 1 or −1.

8. A receiving device comprising:
means for receiving a signal representing a complex symbol '$X_k$' in the frequency domain and a signal representing a symbol '$Y_k$' on at least an even number 'N', strictly greater than 4, of frequencies 'k', with k=0 to N−1, from a transmitter, the symbol $Y_k$ being derived from the symbols $X_k$, for each frequency k and for a given integer value M chosen as an even value between 0 and N−1 inclusive, by a formula: $Y_k = \epsilon(-1)^{k+1} X^*_{M-1-k}$, wherein $\epsilon$ is 1 or −1, $X^*$ indicates the complex conjugate of X, and M−1−k is taken modulo N;
means for pairing received signals on the frequencies according to an emitting pairing scheme; and
means for decoding a space frequency code on each pair of received signals according to a variant of Alamouti encoding code used by an emitter to encode the signals emitted on the pair of frequencies.

9. An emitting device comprising:
at least two transmit antennas;
a transmitter that transmits, on each antenna, at least an even number 'N' of different frequencies;
a first emitter that emits, on a first antenna and during a given time slot on each frequency, with k=0 to N−1, a signal representing a complex symbol '$X_k$' in the frequency domain; and
a second emitter that emits, on a second antenna and during the same time slot, on each frequency 'k', with k=0 to N−1, a signal representing a symbol '$Y_k$',
wherein for a given integer value M chosen between 0 and N−1 inclusive, the symbol $Y_k$ is derived from the symbols $X_k$, for each frequency k, by a formula: $Y_k = \epsilon(-1)^{k+1} X^*_{M-1-k}$, wherein $X^*$ indicates the complex conjugate of X and $\epsilon$ is 1 or −1.

10. A receiving device comprising:
a receiver that receives a signal representing a complex symbol '$X_k$' in the frequency domain and a signal representing a symbol '$Y_k$' on at least an even number 'N', strictly greater than 4, of frequencies 'k', with k=0 to N−1, from a transmitter, the symbol $Y_k$ being derived from the symbols $X_k$, for each frequency k and for a given integer value M chosen as an even value between 0 and N−1 inclusive, by a formula: $Y_k = \epsilon(-1)^{k+1} X^*_{M-1-k}$, wherein $\epsilon$ is 1 or −1, $X^*$ indicates the complex conjugate of X, and M−1−k is taken modulo N;
a pairer that pairs received signals on the frequencies according to an emitting pairing scheme; and
a decoder that decodes a space frequency code on each pair of received signals according to a variant of Alamouti encoding code used by an emitter to encode the signals emitted on the pair of frequencies.

* * * * *